United States Patent
Marsilius

(10) Patent No.: US 12,077,833 B2
(45) Date of Patent: Sep. 3, 2024

(54) METAL STRIP, METHOD FOR PRODUCING AN AMORPHOUS METAL STRIP AND METHOD FOR PRODUCING A NANOCRYSTALLINE METAL STRIP

(71) Applicant: Vacuumschmelze GmbH & Co. KG, Hanau (DE)

(72) Inventor: Mie Marsilius, Hanau Klein-Auheim (DE)

(73) Assignee: VACUUMSCHMELZE GMBH & CO. KG, Hanau (DE)

(*) Notice: Subject to any disclaimer, the term of this patent is extended or adjusted under 35 U.S.C. 154(b) by 149 days.

(21) Appl. No.: 17/007,481

(22) Filed: Aug. 31, 2020

(65) Prior Publication Data

US 2021/0062290 A1    Mar. 4, 2021

(30) Foreign Application Priority Data

Sep. 3, 2019   (DE) .................. 10 2019 123 500.6

(51) Int. Cl.
  *C21D 9/56*  (2006.01)
  *B21B 3/02*  (2006.01)
  (Continued)

(52) U.S. Cl.
  CPC .............. *C21D 9/56* (2013.01); *B21B 3/02* (2013.01); *C21D 6/00* (2013.01); *C21D 8/0205* (2013.01); *C21D 8/0221* (2013.01); *C22C 38/06* (2013.01); *C22C 38/12* (2013.01); *C22C 38/14* (2013.01); *C22C 45/02* (2013.01); *H01F 1/147* (2013.01); *H01F 1/15333* (2013.01); *C21D 2201/03* (2013.01); *C22C 2200/02* (2013.01)

(58) Field of Classification Search
  None
  See application file for complete search history.

(56) References Cited

U.S. PATENT DOCUMENTS 4,793,400 A   12/1988  Wood
4,881,989 A   11/1989  Yoshizawa et al.
(Continued)

FOREIGN PATENT DOCUMENTS

CN        1323360 A    11/2001
CN      101263240 A     9/2008
(Continued)

OTHER PUBLICATIONS

C. Minnert, M. Kuhnt, S. Bruns, A. Marshal, K. Pradeep, M. Marsilius, E. Bruder, K. Durst, Study on the Embrittlement of Flash Ennealed Fe85.2B9.5P4Cu0.8Si0.5 Metallic Glass Ribbons, Materials and Design, 156 (2018) 252-261.
(Continued)

*Primary Examiner* — Xiaobei Wang
(74) *Attorney, Agent, or Firm* — Dickinson Wright PLLC

(57) ABSTRACT

A metal strip is provided having a casting-wheel side that has been solidified on an outer surface of a heat sink, an opposing, air side and a microstructure. The microstructure is at least 80 vol. % amorphous or has at least 80 vol. % nanocrystalline grains and a residual amorphous matrix in which at least 80% of the nanocrystalline grains have an average grain size of less than 50 nm and a random orientation. The air side of the metal strip has a surface crystallisation proportion of less than 23%.

41 Claims, 8 Drawing Sheets

(51) Int. Cl.
*C21D 6/00* (2006.01)
*C21D 8/02* (2006.01)
*C22C 38/06* (2006.01)
*C22C 38/12* (2006.01)
*C22C 38/14* (2006.01)
*C22C 45/02* (2006.01)
*H01F 1/147* (2006.01)
*H01F 1/153* (2006.01)

(56) References Cited

U.S. PATENT DOCUMENTS

| | | | |
|---|---|---|---|
| 5,043,029 | A | 8/1991 | Liebermann et al. |
| 6,254,695 | B1 | 7/2001 | Herzer et al. |
| 8,699,190 | B2 | 4/2014 | Herzer |
| 9,700,937 | B2 | 7/2017 | Schulz |
| 2003/0041931 | A1 | 3/2003 | Sunakawa et al. |
| 2009/0065100 | A1 | 3/2009 | Yoshizawa et al. |
| 2009/0266448 | A1 | 10/2009 | Ohta et al. |
| 2010/0043927 | A1 | 2/2010 | Makino |
| 2010/0084056 | A1 | 4/2010 | Ohta et al. |
| 2012/0040206 | A1* | 2/2012 | Schulz ............ C22C 38/00 164/463 |
| 2012/0127620 | A1 | 5/2012 | Herzer |
| 2012/0262266 | A1 | 10/2012 | Herzer et al. |
| 2012/0318412 | A1* | 12/2012 | Ohta ............ C21D 6/001 148/403 |
| 2013/0319090 | A1 | 12/2013 | Prest et al. |
| 2014/0104024 | A1 | 4/2014 | Herzer et al. |
| 2014/0191832 | A1 | 7/2014 | Ohta et al. |
| 2016/0036264 | A1* | 2/2016 | Bae ............ H02J 50/70 320/108 |
| 2016/0196907 | A1* | 7/2016 | Ohta ............ C21D 1/18 148/108 |
| 2016/0329140 | A1 | 11/2016 | Herzer et al. |
| 2019/0133005 | A1 | 5/2019 | Polak et al. |

FOREIGN PATENT DOCUMENTS

| | | |
|---|---|---|
| CN | 101351571 A | 1/2009 |
| CN | 101663410 A | 3/2010 |
| CN | 102741437 A | 10/2012 |
| CN | 102822372 A | 12/2012 |
| CN | 103238190 A | 8/2013 |
| CN | 103502481 A | 1/2014 |
| CN | 103748250 A | 4/2014 |
| CN | 104376950 A | 2/2015 |
| CN | 104831169 A | 8/2015 |
| CN | 105655079 A | 6/2016 |
| CN | 107532267 A | 1/2018 |
| CN | 112853234 A | 5/2021 |
| EP | 0271657 A2 | 6/1988 |
| EP | 1260812 A2 | 11/2002 |
| EP | 2243854 A1 | 10/2010 |
| EP | 3089175 A1 | 11/2016 |
| JP | H03133552 A | 6/1991 |
| JP | H0578796 A | 3/1993 |
| JP | 2000119825 A | 4/2000 |
| JP | 2001295005 A | 10/2001 |
| JP | 2002316243 A | 10/2002 |
| JP | 2011149045 A | 8/2011 |
| WO | 2013/051380 A1 | 4/2013 |

OTHER PUBLICATIONS

G. Herzer; Nanocrystalline Soft Magnetic Alloys, Handbook of magnetic materials, vol. 10, Ch. 3, pp. 415-461.

Nanocrystalline Vitroperm EMC Products, Advanced Magnetic Solutions, Vacuumschmelze, pp. 1-27.

Vitroperm 270 Brochure, Advanced Materials—The Key to Progress, Vacuumschmelze, pp. 1-2.

* cited by examiner

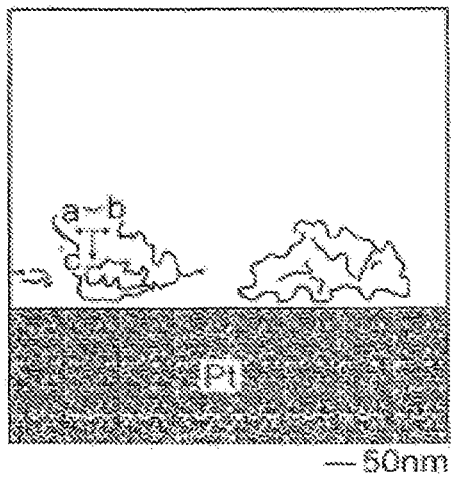
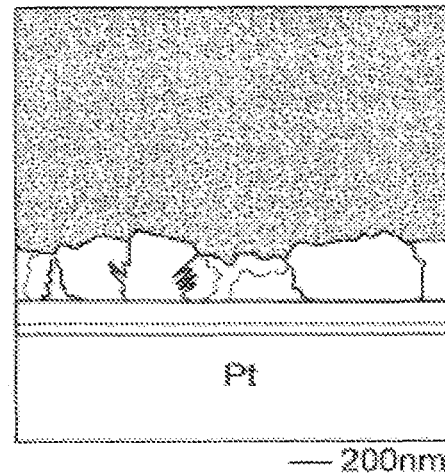
Fig. 2A          Fig. 2B
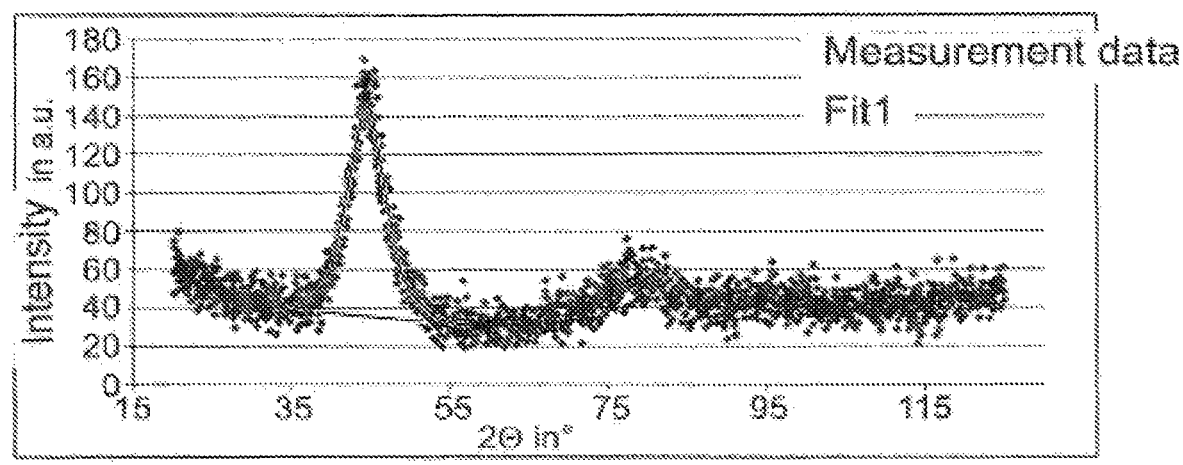
Fig. 3

METAL STRIP, METHOD FOR PRODUCING AN AMORPHOUS METAL STRIP AND METHOD FOR PRODUCING A NANOCRYSTALLINE METAL STRIP

This US patent application claims the benefit of DE Patent Application No. 10 2019 123 500.6, filed Sep. 3, 2019, the entire contents of which is incorporated herein by reference for all purposes.

BACKGROUND

1. Technical Field

The invention relates to a metal strip, to a method for producing an amorphous metal strip and to a method for producing a nanocrystalline metal strip.

2. Related Art

Amorphous metal strips can be produced using a rapid solidification technology such as a melt-spinning process if an alloy with an appropriate content of glass-forming elements, or "metalloids", is used.

Iron-based soft magnetic alloys consisting of $Fe_{100-a-b-w-x-y-z} T_a M_b Si_w B_x P_y C_z$ can also be produced in the form of amorphous strips by means of rapid solidification technology. These rapidly solidified amorphous iron-based metal strips possess good soft magnetic properties and can therefore be used either directly or as a starting product for nanocrystalline materials, e.g. as iron cores for inductive components or as shielding foils as disclosed in US 2012/262266 A1 and DE 10 2013 103268 B4 respectively, for example. In addition, they also possess particularly good and attractive mechanical properties in the amorphous state, e.g. a relatively low E-modulus and high hardness, and can therefore be used as a spring material or for knives and razor blades.

The demands made on amorphous and nanocrystalline metal strips are constantly increasing with the desire for ever better properties, smaller thicknesses and longer lengths. In order to improve the cost-effectiveness of these amorphous metal strips, in particular, it is desirable to be able to produce longer strip lengths, e.g. continuous lengths of several kilometres, more reliably.

SUMMARY

An object is therefore to meet this need by providing an improved amorphous metal strip.

According to the invention, a metal strip is provided with a casting-wheel side that has been solidified on an outer surface of a heat sink, i.e. a casting wheel, an opposing, air side and a microstructure that is at least 80 vol. % amorphous or contains at least 80 vol. % nanocrystalline grains and a residual amorphous matrix in which at least 80% of the nanocrystalline grains have an average grain size of less than 50 nm and a random orientation. The air side has a surface crystallisation proportion of less than 23%.

The surface crystallisation proportion describes the proportion of the air side of the metal strip that includes crystallites formed at the air side surface. The proportion can also be denoted as a fraction or a level or a portion.

The metal strip is therefore produced using a rapid solidification technology in which a molten mass is solidified on the outer surface of the casting wheel. In an embodiment the microstructure is at least 80 vol. % amorphous. The metal strip with this amorphous microstructure can therefore be described as being in the as-cast state.

In an embodiment the metal strip comprises at least 80 vol. % nanocrystalline grains and a residual amorphous matrix in which at least 80% of the nanocrystalline grains have an average grain size of less than 50 nm and a random orientation. The nanocrystalline grains are typically formed by annealing the amorphous metal strip such that the metal strip, which comprises at least 80 vol. % nanocrystalline grains and a residual amorphous matrix in which at least 80% of the nanocrystalline grains have an average grain size of less than 50 nm and a random orientation, can be described as being in the annealed nanocrystalline state.

A metal strip can also be referred to as a metal foil.

Owing to the production process, the casting-wheel side and the air side of the metal strip have a different condition and can therefore be identified in the final metal strip. The casting-wheel side and the air side of the metal strip can even be distinguished by the naked eye. The air side is typically shiny and metallic while the casting-wheel side is more matt.

It has, surprisingly, been established that rapidly solidified amorphous metal strips and the nanocrystalline metal strips produced from them by means of heat treatment are affected by the occurrence of surface crystallisation and that this unexpected surface crystallisation in turn influences their mechanical and magnetic properties and, consequently, the reliability with which good properties, e.g. mechanical properties and, in the case of magnetic alloys, good magnetic properties, can be achieved.

Surface crystallisation denotes the formation of crystalline grains at the surface of the strip, i.e. within a surface layer of the strip. For example, more than 80 vol. % of the crystalline grains in the surface layer have an average grain size of greater than 100 nm.

These crystalline grains have in the case of a nanocrystalline metal strip a greater average grain size than the nanocrystalline grains in a nanocrystalline metal strip and can therefore be distinguished from them. The crystalline grains in the surface layer, for example, have an average grain size of greater than 100 nm while the nanocrystalline grains have an average grain size of a maximum of 50 nm.

In some embodiments the crystalline grains in the surface crystallisation have a texture, i.e. crystallographic texture.

In some embodiments, if the nanocrystalline grains have a random orientation and no crystallographic texture it is possible to distinguish the crystalline grains in the surface crystallisation from the nanocrystalline grains by their crystallographic texture.

Owing to their amorphous microstructure, amorphous metal strips have an inherent ductility that enables the production of lengths of continuous strip. This inherent ductility is also exploited in certain applications. The ductility of an amorphous metal strip can be determined by means of the mechanical property of elongation at fracture.

However, the occurrence of surface crystallisation may adversely affect this ductility, resulting, for example, in strip tears during strip production since following rapid solidification of the molten mass in order to form the strip from the molten mass, the metal strip is continuously wound. It should be noted that production speeds of 10 to 50 m per second are customary in industrial-scale plants and that the smallest irregularity in the mechanical properties of the amorphous metal strip can therefore result in strip tears (breaks). Consequently, according to the invention, the proportion of surface crystallisation at the air side—and in certain embodiments at the casting-wheel side—of the amorphous metal strip is limited to less than 23% in order to achieve good ductility and uniform mechanical properties including ductility and elongation at fracture.

It has been established that the cooling rate of the molten mass (melt) influences the level of surface crystallisation observed, with lower cooling rates favouring surface crystallisation. It has also been established that in conventional production processes cooling rates can vary over the length of a casting process, promoting the formation of surface crystallisation at least intermittently.

This variation in cooling rate and the associated variation in the proportion of the surface crystallisation can lead to a variation in mechanical properties, including the ductility of the amorphous metal strip, over the length of the strip.

In order to achieve good mechanical and soft magnetic properties the invention therefore endeavours to avoid a crystalline microstructure at the surface as far as possible. In the case of nanocrystalline metal strips, effort is made to achieve the random orientation of the many small crystallites, which have grain sizes within a range of a few tens of nanometres, i.e. significantly below the exchange interaction length, in order to achieve good soft magnetic properties. The exchange interaction is responsible for the collective ordering of magnetic moments in the material, and the exchange interaction length describes the maximum distance between two magnetic moments at which they are still able to interact. If the grain size is below the exchange interaction length and the crystalline grain direction is randomly distributed, any possible crystal anisotropy is prevented due to exchange interaction.

The extent or proportion of surface crystallisation can be determined by means of X-ray powder diffractometry using copper Kα radiation. The surface crystallisation proportions specified here are determined as follows. For an amorphous foil, the surface crystallisation proportion is determined by dividing the area under a characteristic reflex of a crystalline phase, i.e. the crystalline phase of the surface crystallisation, by the sum of the area under a halo characteristic of an amorphous phase and the area under of the characteristic reflex of the crystalline phase.

The characteristic reflex of the crystalline phase of surface crystallisation depends on the structure and composition of the crystalline phase. For example, a (400) reflex is used for phases containing silicon if, as is almost always the case here, they are strongly textured in the (100) direction.

Since surface crystallisation is almost always strongly textured in the (100) direction in these cases, the surface crystallisation proportion of a nanocrystalline sample can be determined as follows.

First, the surface portion of a second characteristic reflex characteristic of the nanocrystalline phase is determined.

Then the area under a first characteristic reflex characteristic of the crystalline phase of surface crystallisation is determined. However, this area should be reduced by the portion of the reflex which is contributed by the nanocrystalline phase. This is 20% of the second characteristic reflex for pure iron and 12.8% for $Fe_3Si$. As the exact Si-content is difficult to ascertain, herein 20% is always deducted. In the case of alloys containing silicon this may lead to a slight underestimation of the extent of surface crystallisation.

For a nanocrystalline foil, the surface crystallisation proportion is determined by dividing the area under a first characteristic reflex of a crystalline phase, i.e. the crystalline phase of the surface crystallisation, minus the portion of the reflex contributed by the nanocrystalline phase, by the sum of the area under a second characteristic reflex characteristic of the nanocrystalline phase and the total area under of the first characteristic reflex of the crystalline phase.

For example, for phases containing silicon a (400) reflex is used as the first characteristic reflex of the surface crystallisation and the (220) reflex is used as the second characteristic reflex of the nanocrystalline phase.

If the surface crystallisation is not textured, its extent can be determined on the a-cast amorphous strip only, as described above for amorphous foils. In the nanocrystalline state the extent of surface crystallisation and the extent of the nanocrystalline phase can no longer be distinguished using powder diffractometry by the lack of texture of the surface crystallisation. However, as the surface crystallisation turns into a continuous layer under heat treatment, the extent of surface crystallisation in the nanocrystalline sample is always equal to or greater than that in the amorphous sample.

In the as-cast state, the air side and the casting-wheel side have a surface crystallisation of less than 23%.

According to the invention, the metal strip has a surface crystallisation proportion of less than 23% on the air side in order to provide good properties such as soft magnetic properties.

In practice, the formation of crystalline grains at the surface of the air side of the metal strip is observed more frequently than the formation of crystalline grains at the surface of the casting-wheel side of the metal strip. This observation may, for example, be the result of a faster cooling rate on the casting-wheel side of the metal strip due to the fact that the casting-wheel side is in direct contact with the heat sink, i.e. the casting wheel.

In an embodiment the air side has a surface crystallisation proportion of less than 5%. The surface crystallisation proportion is preferably kept as small as possible and may even be 0, as a result of which no surface crystallisation can be measured.

In an embodiment the casting-wheel side has a surface crystallisation proportion of less than 23%, preferably less than 5%. The casting-wheel side preferably has no surface crystallisation, making the surface crystallisation proportion 0%.

In an embodiment the metal strip has a surface layer that has between 0.01% and 5% of the total volume and the crystalline grains that form the surface crystallisation.

This embodiment relates to metal strips that contain crystalline grains, i.e. the surface crystallisation proportion is greater than 0%, and also metal strips in the as-cast state.

In an embodiment the metal strip has a surface layer that represents between 0.01% and 5% of the total volume and contains crystalline grains that form the surface crystallisation.

This embodiment relates to metal strips that have crystalline grains at the surface in the nanocrystallised state that were already present in the as-cast state, i.e. the extent of surface crystallisation is greater than 0%.

In an embodiment the crystalline grains have a grain size of greater than 100 nm. They may also be larger than 250 nm. In an embodiment at least 80 vol. % of the crystalline grains have an average grain size of greater than 100 nm. The crystalline grains can therefore be distinguished from the smaller nanocrystalline grains, which have an average grain size of no more than 50 nm.

In an embodiment the casting-wheel side and the air side of the metal strip each have a surface area of at least 100 $m^2$ and the proportion of surface crystallisation of these surfaces, measured on a plurality of samples of at least 1 $cm^2$ of this surface, is less than 23%, preferably less than 15%.

In an embodiment the surface crystallisation proportion of the casting-wheel side and/or the air side is less than 23%, preferably less than 15%, over a length of at least 2 km. A large or long metal strip with low surface crystallisation is therefore provided. This allows parts such as inductive components to be produced reliably with the desired properties on a commercial basis.

In an embodiment a surface area of 1 cm² of both the casting-wheel side and the air side of the metal strip is examined. The surface crystallisation proportion of this area is less than 23%, preferably less than 15%.

The formation of surface crystallisation can create a fault or breaking point that may lead to a break or tear in the strip during the production process or in a further process such as continuous heat treatment. The amorphous metal strip according to the invention can be produced in a continuous length of up to 8 km, preferably up to 50 km, particularly preferably up to and above 100 km, in one casting process since the lack of surface crystallisation or low surface crystallisation makes avoiding strip tears easier.

The metal strip can have a width of 2 mm to 300 mm, preferably 40 mm to 200 mm, and/or a thickness of less than 50 µm, preferably less than 25 µm, preferably less than 20 µm, preferably between 10 µm and 18 µm.

It has been established that a further factor influencing the occurrence of surface crystallisation is the purity of the metal strip, in particular the purity of the molten mass from which the metal strip is produced using rapid solidification technology. The purity of the molten mass can also influence the cooling rate, which in turn influences the occurrence of surface crystallisation. In an embodiment the metal strip has a titanium content of less than 0.25 at. %, an aluminium content von less than 0.4 at. %, a manganese content of less than 0.4 at. % and a sulphur content of less than 0.35 at. % in order to reduce surface crystallisation. Herein at. % denotes atomic percent.

It has been found that for iron-based metal strips with a composition of $Fe_{100-a-b-w-x-y-z} T_a M_b Si_w B_x P_y C_z$, for example, components with high $\mu_{dyn}$, values can only be reliably produced with a surface crystallisation proportion of less than 23%. In an embodiment the metal strip or the component from which the metal strip is manufactured therefore has a $\mu_{dyn}>100000$, preferably 150000.

In an embodiment the casting-wheel side of the metal strip has a surface roughness with an arithmetic mean, Ra, of less than 0.8 µm, preferably less than 0.7 µm. A small surface roughness is also advantageous in order to increase the fill factor in wound components or stacked components since the gaps created between adjacent layers are smaller.

In an embodiment the metal strip consists of (Fe, T)$_a$M$_b$ and up to 1 at. % impurities, where 70 at. %≤a≤90 at. % and 10 at. %≤b≤30 at. %, T being one or more of the elements Co, Ni, Cu, Cr, Zn, Sn and V, and M being one or more of the elements Nb, Mo, Zr, Ta, B, Si, C and P.

A total of up to 1 at. % incidental impurities may be present, preferably up to 0.5 at. %, preferably up to 0.2 at. %. In addition to other incidental impurities, it may include up to 0.1 wt. % aluminium, up to 0.05 wt. % sulphur, up to 0.1 wt. % nitrogen and/or up to 0.1 wt. % oxygen.

In an embodiment the metal strip consists of $Fe_{100-a-b-w-x-y-z} T_a M_b Si_w B_x P_y C_z$ (in at. %) and up to 1 at. % impurities, T being one or more of the group consisting of Co, Ni, Cu, Cr, Zn, Sn and V, and M being one or more of the group consisting of Nb, Mo, Zr and Ta, where $0 \leq a \leq 80$ $0 \leq b \leq 10$ $0 \leq w \leq 25$ $2 \leq x \leq 20$ $0 \leq y \leq 7$ $0 \leq z \leq 2$.

Furthermore, the metal strips may contain up to 1 at. % of the customary impurities.

A total of up to 1 at. % incidental impurities may be present, preferably up to 0.5 at. %, preferably up to 0.2 at. %. In addition to other incidental impurities, up to 0.1 wt. % aluminium, up to 0.05 wt. % sulphur, up to 0.1 wt. % nitrogen and/or up to 0.1 wt. % oxygen may be present.

The amorphous metal strip and the nanocrystalline strip can also be made of a copper-based alloy such as VITROBRAZE 2255 (nominal composition in at. %: $Cu_{76.2}Ni_7Sn_{9.3}P_{6.5}Zn_1$) or a nickel-based alloy such as VITROBRAZE 2150 (nominal composition in at. %: $Ni_{73.35}Cr_{18.2}Si_{7.3}B_{1.15}$) or a cobalt-based alloy such as VITROVAC 6025 (nominal composition in at. %: $Co_{68}Fe_4Mo_2Si_{16}B_{10}$) or a nanocrystallisable alloy such as VITROPERM 800 (nominal composition in at.:% $Fe_{73.9}Cu_1Nb_3Si_{15.5}B_{6.6}$).

A method is also provided for the production of an amorphous metal strip using a rapid solidification technology. The method comprises the following:

providing a molten mass of an iron-based, cobalt-based, nickel-based or copper-based alloy with a metalloid content of 10 to 30 at. %, continuously pressing a rolling device onto an outer surface of a heat sink, i.e. casting-wheel with a pressure sufficient to smooth the outer surface of the heat sink as the molten mass is poured onto the moving outer surface of the heat sink, pouring, i.e. casting, the molten mass onto the moving outer surface of the moving heat sink, whereby the molten mass solidifies on the outer surface and an amorphous metal strip is formed.

The amorphous metal strip produced in this manner has a casting-wheel side that has solidified on the outer surface of the heat sink, and an air side that opposes the casting-wheel side. The amorphous metal strip also has a microstructure that is at least 80 vol. % amorphous. The air side and the casting-wheel side have a surface crystallisation proportion of less than 23%, preferably less than 5%.

In this method the surface of the heat sink, i.e. casting-wheel is smoothed continuously during pouring. The outer surface is in contact with the rolling device as the heat sink moves. The rolling device is used to work and prepare the outer surface repeatedly before the molten mass solidifies on it. The outer surface can be rolled with the rolling device and so reshaped, thereby smoothing the outer surface.

In this context, the term "reshaping" is used to refer to the redistribution of material. The purpose of using the rolling device is not to remove material from the outer surface as might be done using a brush. As a result no swarf and almost no abrasion or dust, which might adversely affect the production process, are created.

The pressure sufficient to reshape the outer surface depends on the material and the state of the heat sink or the outer surface of the heat sink. Less pressure is used with a soft material such as copper than with a hard material such as a higher alloyed Cu alloy or molybdenum, for example.

In particular, the rolling device is pressed against a point on the outer surface of the movable heat sink located between the point at which the strip detaches from the heat sink and the casting surface, i.e. the point on the heat sink at which the molten mass hits the heat sink. Consequently, the outer surface can be reshaped by the rolling device after the strip has solidified on the outer surface and before the next contact with the molten mass. This point on the outer surface at which the molten mass hits is part of the so-called casting track on the outer surface of the movable heat sink.

This smoothing of the surface of the heat sink by reshaping the surface also serves to keep the cooling rate of the solidification of the molten mass even over the length of the casting process. This makes it easier to avoid the occurrence of increased surface crystallisation in parts of the length of a strip and a variation in surface crystallisation over the length of a strip.

In an embodiment the rolling device can be pressed against the outer surface of the movable heat sink such that the outer surface is smoothed by the rolling device. Consequently, the roughness of the outer surface after contact with the rolling device or reshaping by the rolling device is lower than before contact with the rolling device. This has the advantage that the roughness of the strip and, in particular, the roughness of the surface of the strip produced by solidification on the outer surface of the movable heat sink, can be kept low. The homogeneity of the strip can thus be provided over longer lengths.

This in turn permits a longer casting process, i.e. the casting process on one casting track is not or does not have to be stopped and it is therefore possible to produce longer continuous metal strips and reduce production costs.

In addition, lower roughness can improve various properties of the strip produced. For example, the surface roughness of some magnetic alloys influences their magnetic properties. By producing a long strip with low, homogenous surface roughness it is possible in one casting process to produce a plurality of magnetic cores that also have more homogenous properties. This can reduce production costs due to fewer losses.

In an embodiment the solidified foil is continuously received on a reel.

In an embodiment the rolling device is designed such that it is continuously in contact with the outer surface of the movable heat sink as the molten mass is poured onto the outer surface of the movable heat sink. This arrangement enables the surface on which the molten mass solidifies to be reshaped and smoothed before it comes into contact with the molten mass again. This results in a more homogenous outer surface and consequently in the production of rapidly solidified strips with lower surface roughness and a lower surface crystallisation proportion.

In a further embodiment the rolling device is designed such that it reduces the roughness of the outer surface of the movable heat sink by reshaping the outer surface as the molten mass is poured onto the outer surface of the movable heat sink. The reshaping of the outer surface therefore leads to reduced surface roughness.

In an embodiment the movable heat sink can be rotated about an axis of rotation, i.e. the movement is a rotation. The circumferential speed of the heat sink is set so as to achieve a desired cooling rate and a desired strip thickness. As the circumferential speed increases, so the strip thickness is increasingly reduced. A typical cooling rate is greater than $10^5$ K/s. The circumferential speed can be 10 m/s to 50 m/s.

The heat sink may take the form of a wheel or a roller, the molten mass being applied to the circumferential surface of this wheel or roller. The axis of rotation is therefore perpendicular to the centre of the circular end of the wheel.

In an embodiment the rolling device can be moved parallel to the axis of rotation of the movable heat sink. In such an arrangement the parallelism is set as well as is technically conceivable using reasonable effort. This arrangement enables the rolling device to be brought into contact with various regions of the width of the heat sink, e.g. with only one part of the circumferential surface of the wheel. This can be advantageous if there is a plurality of casting tracks on one heat sink. Casting tracks can thus be reshaped by the rolling device one after another such that a plurality of castings can be carried out with the same heat sink but with different casting tracks without changing the heat sink. This can reduce production times and so production costs.

It may also be possible to move the rolling device perpendicularly in relation to the outer surface of the movable heat sink. When the outer surface moves in the z direction, the rolling device can be moved in the x direction and/or in the y direction. A movement in the x direction can, for example, make it possible to reshape different strip-shaped regions of the outer surface. A movement in the y direction can be used to adjust the pressure with which the rolling device is pressed against the outer surface.

In an embodiment the rolling device has a roller that can be rotated and pressed against the outer surface of the movable heat sink. The roller of the rolling device thus comes into contact with the outer surface of the movable heat sink in order to repeatedly re-prepare the outer surface. The rolling device can further have a holder for the roller by means of which the roller is mounted rotatably and can be moved in relation to the outer surface, e.g. parallel to the axis of rotation of the movable heat sink and/or parallel to the outer surface of the movable heat sink. The contact between the molten mass and the outer surface can produce roughness and irregularities in the outer surface. As the outer surface comes into repeated contact with the molten mass, the quality of the outer surface deteriorates further the longer the casting time lasts.

These irregularities can be smoothed out with the rolling device so as to provide a re-smoothed outer surface underneath the molten mass. Consequently, the surface roughness of the underside surface of the strip formed during the solidification of the molten mass on the outer surface can be kept more homogenous over the length of the strip.

In an embodiment the rolling device has a roller mounted such that it is able to rotate.

The heat sink provided may take the form of a rotatable casting wheel, the molten mass being poured onto the edge of the casting wheel. The roller of the rolling device can be arranged so that together with the edge it forms a rolling mill that reshapes and smooths the surface of the edge.

If a rotatable roller is provided as the rolling device, this roller may be driven in a first direction of rotation and the heat sink in a second direction of rotation, the first direction of rotation being opposite the second direction of rotation. The heat sink is able to drive the roller due to the friction between the roller and the heat sink. This results in two opposing directions of rotation. The roller can also be driven independently by a separate control system.

In an embodiment the roller is moved over the outer surface as parallel as is technically possible with reasonable effort in relation to the second axis of rotation of the heat sink as the heat sink moves such that it comes into contact with and reshapes the outer surface in a spiral shape. This embodiment can be used in order to reduce irregularities across the entire width of the outer surface.

In an embodiment the casting-wheel side has a surface crystallisation proportion of less than 23%, preferably less than 5%.

In an embodiment the outer surface is protected from organic material at least the point at which the molten mass hits the outer surface as the molten mass is poured onto the moving outer surface of the moving heat sink. This makes it easier to avoid the formation of irregularities in the surface and holes in the metal strips that could serve as nuclei for the formation of crystalline phases. This makes it easier to avoid the formation of crystalline grains at the surface.

In an embodiment the heat sink is made of a material with a thermal conductivity of greater than 200 W/mK. In an embodiment the heat sink is made of a material with a thermal conductivity of greater than 200 w/mK and a Vickers hardness of less than 250 HV but greater than 130 HV. This combination of material parameters promotes the reduction of surface crystallisation since the higher thermal conductivity helps increase the cooling rate and the hardness results in improved smoothing of the surface of the heat sink. A higher cooling rate should result in less surface crystallisation.

A metal strip produced according to any one of the embodiments described here can be provided with the following properties. In an embodiment the amorphous metal strip has a width of 2 mm to 300 mm and/or a thickness of less than 50 μm.

In an embodiment the metal strip has a surface layer that represents between 0.01% and 5% of the total volume and contains crystalline grains that form the surface crystallisation.

In an embodiment the crystalline grains have a grain size of greater than 100 nm. However, they can also be larger than 250 nm. In an embodiment at least 80 vol. % of the crystalline grains have an average grain size of greater than 100 nm.

In an embodiment the casting-wheel side and the air side each have a surface area of at least 100 m² and the level of surface crystallisation on these surfaces is less than 23%, preferably less than 15%. The surface crystallisation proportion is determined from this surface on a plurality of approx. 1 cm² sample pieces.

As already indicated above, an iron-based metal strip can be produced using a method according to any one of the embodiments described here.

In an embodiment the metal strip consists of $(Fe,T)_aM_b$ and up to 1 at. % impurities, where 70 at. %≤a≤90 at. % and 10 at. %≤b≤30 at. %, T being one or more of the elements Co, Ni, Cu, Cr, Zn, Sn and V and M being one or more of the elements Nb, Mo, Zr, Ta B, Si, C and P.

A total of up to 1 at. % incidental impurities may be present, preferably up to 0.5 at. %, preferably up to 0.2 at. %. In addition to other incidental impurities, it may include up to 0.1 wt. % aluminium, up to 0.05 wt. % sulphur, up to 0.1 wt. % nitrogen and/or up to 0.1 wt. % oxygen.

In an embodiment the metal strip consists of $Fe_{100-a-b-w-x-y-z}T_a t M_b Si_w B_x P_y C_z$ (in at. %) and up to 1 at. % impurities, T being one or more of the group consisting of Co, Ni, Cu, Cr, Zn, Sn and V, and M being more or more of the group consisting of Nb, Mo, Zr and Ta, where $0 \leq a \leq 80$ $0 \leq b \leq 10$ $0 \leq w \leq 25$ $2 \leq x \leq 20$ $0 \leq y \leq 7$ $0 \leq z \leq 2$.

Furthermore, the metal strips may contain up to 1 at. % of the customary impurities.

A total of up to 1 at. % incidental impurities may be present, preferably up to 0.5 at. %, preferably up to 0.2 at. %. In addition to other incidental impurities, it may include up to 0.1 wt. % aluminium, up to 0.05 wt. % sulphur, up to 0.1 wt. % nitrogen and/or up to 0.1 wt. % oxygen.

A method for the production of a nanocrystalline strip is also provided. An amorphous metal strip produced using a method according to any one of the embodiments described here is heat treated at a temperature Ta, where 450° C. 5≤Ta≤750° C., in order to generate a nanocrystalline microstructure in the foil in which at least 80 vol. % of the grains have an average size of less than 50 nm.

The nanocrystalline microstructure may have no texture, e.g. in embodiments in which at least 80 vol. % of the grains have an average size of less than 50 nm and a random orientation.

For Co-based alloys the temperature $T_a$ can be between 400° C. and 750° C. For iron-based alloys 450° C. 5≤Ta≤750° C. may apply.

In an embodiment the strip is heat treated in a continuous furnace. In an embodiment the strip is drawn through the continuous furnace at a speed s such that the strip dwell time in a temperature zone of the continuous furnace with a temperature Ta is between two seconds an two minutes.

In an embodiment the strip is continuously heat treated under a tensile stress of 5 MPa to 1000 MPa.

In an embodiment a desired anisotropy field strength value, Ha, or a desired permeability value and optionally a maximum remanence ratio value, $J_r/J_s$, of less than 0.02, and/or a maximum coercive field strength value, $H_c$, of less than 1% of the anisotropy field strength, $H_a$, and/or less than 10 A/m, and a permitted deviation range of each of these values are predetermined, and the magnetic properties of the strip are measured continuously as the strip leaves the continuous furnace, and if deviations of the magnetic properties from the permitted deviation range are detected, the tensile stress on the strip is adjusted accordingly in order to bring the measured values of the magnetic properties back within the permitted deviation range.

According to the invention an amorphous metal strip with the lowest possible level of surface crystallisation is provided in order to achieve good mechanical properties. The metal strip may, in addition, be provided on an industrial scale in continuous lengths of up to 8 km, preferably up to 50 km, particularly preferably of over 100 km. This can be achieved by keeping the cooling rate of the solidification of the molten mass sufficiently high for the entire casting process. This can be achieved by reshaping and smoothing the surface of the heat sink and by protecting it from dust and other impurities, and/or by making the surface of the heat sink of a suitable material and/or by providing the molten mass with an appropriate content of glass-forming elements and few impurities, in particular Ti, Al, Mn and S.

A metal strip according to any one of the embodiments described here can be used in many different technical fields.

A metal strip according to any one of the embodiments described here can be used in a soft magnetic core or an inductive component. For example, the metal strip can be wound into a coil, which then serves as a core or a soft magnetic part of a component such as an inductive component.

A metal strip according to any one of the embodiments described here can be used in a soft magnetic core in antenna or sensor applications.

The mechanical properties of the metal strip can be used in applications such as blades, as amorphous springs or as knife blades.

In other applications a metal strip according to any one of the embodiments described here can be used as a brazing foil for brazing.

A metal strip according to any one of the embodiments described here can also be used as a layer of a laminate. For example, the metal strip can be arranged on a carrier and, for example, fixed to the carrier by means of adhesive. A plurality of layers of the metal strip can be stacked one on top of another to form a laminate.

A metal strip according to any one of the embodiments described here can be used as a shielding foil in an object with parts for wireless charging or as a shielding foil in an object with parts to be shielded. In these embodiments the metal strip is made of a soft magnetic alloy.

The parts to be shielded may be one or more of the group consisting of electronic components, cables, sensor surfaces and cavities.

BRIEF DESCRIPTION OF THE DRAWINGS

The invention is explained in greater detail below with reference to the drawings and examples.

FIG. 2A shows a dark-field TEM image of an amorphous sample with surface crystallisation.

FIG. 2b shows a dark-field TEM image, which is the same sample as FIG. 2a except in the heat-treated, nanocrystalline state.

FIG. 3 shows a diffractogram of an amorphous sample.

DETAILED DESCRIPTION OF EXAMPLE EMBODIMENTS

Figure 1:
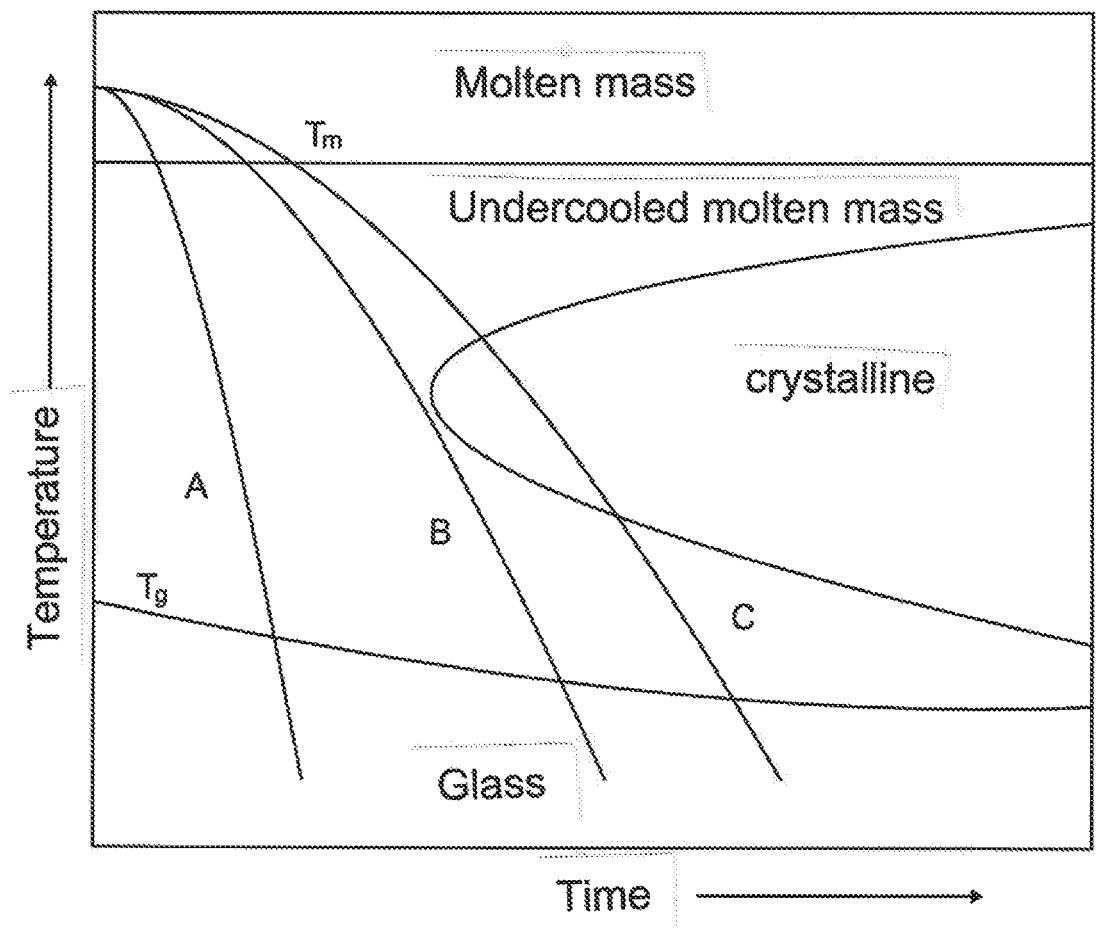
FIG. 1 shows a schematic time-temperature transformation diagram.

One example of a rapid solidification technology is the melt-spinning process. During production using melt-spinning a glass-forming metal alloy is melted in a crucible that is typically made substantially of oxide ceramic (e.g. aluminium oxide) or graphite. Depending on the reactivity of the molten mass, the melting process may take place in air, in a vacuum or in an inert gas such as argon or nitrogen, for example. Once the alloy has been melted down at temperatures well above the liquidus point, the molten mass is transported to a casting tundish and injected through a casting nozzle, which generally has a slit-shaped outlet opening, onto a rotating heat sink, e.g. a roller or wheel made of a copper alloy. To this end, the casting nozzle is brought very close to the surface of the rotating copper cylinder at a distance of approx. 50 μm to 500 μm from it. The molten mass passes through the nozzle outlet and hits the moving surface of the heat sink where it solidifies at cooling rates of approx. 104 K/min to $10^6$ K/min. The rotational movement of the roller carries the solidified molten mass away as a continuous foil strip, detaches it from the cool roller and winds it onto a winding device.

Amorphous metal strips produced using the melt-spinning process have thicknesses of between approx. 10 μm and approx. 30 μm. Standard widths range from 5 mm to 200 mm.

In addition to the aforementioned high cooling rates, the production of amorphous metal strips also requires a non-metallic, so-called metalloid or glass-forming content in the alloy in order to disrupt the formation of a crystalline microstructure. Elements commonly used as metalloids in this context are boron, silicon, phosphorus and niobium, and the total content is usually between 10 at.-% and 30 at.-%. Iron, nickel and cobalt, in particular, but also copper, are used as the metals owing to their ferromagnetic order at room temperature. Typical alloys and their production are described in EP 0 271 657 A, for example.

It has been found that both the magnetic properties in the case of magnetic alloys and the workability of foils are significantly influenced, even impaired, by surface crystallisation caused during production. Crystallites with a typical grain size of a few hundred nanometres form directly under the surface. In the case of iron-based alloys, they may for example, be cubic, body-centred α-Fe or Fe3Si grains. One possible explanation for this observation is explained with reference to FIG. 1.

The present invention is based on the new finding that partial crystallinity in the proximity of the surface of rapidly solidified strips generally occurs when heat cannot be dissipated sufficiently quickly during production of the strip to generate a completely amorphous microstructure, and that the cooling rate may vary due to various factors.

The necessary cooling rate is determined amongst other factors by the metalloid content of the alloy. The larger the content of structure-disrupting atoms, i.e. the larger the metalloid content, the lower the cooling rates needed for complete amorphous solidification.

FIG. 1 shows a schematic representation of a time-temperature transformation diagram for metallic glasses on which possible cooling curves are plotted. Depending on the cooling speed, the material coming from the molten mass or melt reaches either the glass or the crystalline state with crystallisation starting locally at so-called crystallisation nuclei such as structural defects in the material, for example.

Curve A with the highest cooling rate very clearly generates an amorphous microstructure. Curve B with its middle cooling rate still generates an amorphous microstructure and can easily be transformed into a partially crystalline microstructure due to crystallisation nuclei. The lowest cooling rate C clearly results in a crystalline state. The presence and the number of crystallisation nuclei therefore have a major influence on the crystallisation of the undercooled molten mass.

According to the invention crystallisation nuclei should therefore be avoided. The following measures are examined and adjusted as ways of keeping the cooling rate high and so better preventing the crystallisation of the undercooled molten mass.

In the melt-spinning process selected, surface crystallinity can occur because a surface always represents a disruption in microstructure and so acts as a crystallisation nucleus. In addition, heat dissipation takes place via a casting wheel made of copper on which the strip lies and the surface opposite the casting wheel, the air side of the metal strip, therefore has lower heat dissipation. This effect can be amplified further if exothermic oxidation with the oxygen in the surrounding air takes place on this free surface because the additional oxidation heat must also be dissipated.

However, surface crystallisation is not observed exclusively on the free surface. Less frequently, the side facing the casting wheel, i.e. the casting-wheel side of the metal strip, can also exhibit surface crystallisation because crystalline copper can act as a very good crystallisation nucleus. For this reason, in what follows below both sides, i.e. the free surface and the surface facing the casting wheel, of the rapidly solidified metallic strip are always examined. As a result it was possible to examine all four cases: surface crystallisation on the air side only, on the casting-wheel side only, on both sides or on neither side.

In order to maintain the outstanding soft magnetic properties and the good mechanical workability of rapidly solidified metallic strips even in the face of the increasing demands for larger widths, higher saturation inductions, lower raw material costs and reduced thicknesses described above, a strip that is as free as possible of surface crystallisation is cast.

Impurities in the molten mass are minimised firstly because they can act as crystallisation nuclei. Secondly, impurities of this type, in particular, that tend to strong exothermic oxide formation in the air, such as aluminium or titanium, are damaging because they promote surface crystallisation. This may be due to the exothermic nature of the oxide formation leading to a locally reduced cooling rate. However, it may also be due to heterogeneous nucleation where these elements are already present in oxide form.

The influence of the casting wheel on surface crystallisation is also examined since it affects surface crystallisation. This includes both the thermal conductivity of the copper alloy and the geometric dimensions of the casting wheel and the casting wheel surface. Wear on this surface during the casting process results in the occurrence of cavities that transport process gas under the molten metal droplet and cause contact difficulties between the molten mass or strip and the roller. This significantly reduces the cooling rate at least locally. In order to minimise casting wheel wear, a high-strength casting-wheel material is selected. Generally, however, the properties of strength and thermal conductivity tend to act in opposite directions in the copper materials usually used in melting metallurgy.

A further parameter that can be used to influence cooling rate is the material of the casting wheel surface.

It has been observed that a significantly higher percentage of strips produced with a casting wheel surface made of a copper-nickel-silicon alloy with a high strength of 200 HV (HV30) exhibit surface crystallisation than the average of approx. 50% of strips produced with a casting wheel surface made of a CuBe alloy. This is due to the alloy's low thermal conductivity of only 150 W/mK.

The tendency to form surface crystallinity significantly improve when beryllium-alloyed copper materials with a thermal conductivity of over 200 W/mK were used. With these materials thermal conductivity increases as beryllium content falls. The best results by a distance were achieved with a material that had a thermal conductivity of 330 W/mK. Low beryllium contents are also advantageous in terms of occupational health and safety since beryllium dusts are poisonous. For this reason the addition of beryllium should be limited to 2 wt. %, preferably 1 wt. %.

The beryllium-alloyed copper materials have strengths of between 130 HV and 250 HV (HV30) depending on the beryllium content. However, the material with the lowest hardness of 130 HV is also that with the highest thermal conductivity.

In order to achieve good, uniform heat contact between the molten mass or strip and the roller with these soft materials and to be able to use them in the casting of amorphous strips in the long term it is advantageous to ensure even processing of the contact surface during the production process itself. The roughness of the casting wheel surface should therefore be kept uniform.

However, material-removing processes such as polishing and brushing, for example, can result in local contact problems or the development of gases due to processing residues (e.g. polishing agents, dust, brushes) on the casting wheel with the aforementioned negative effects on local cooling rates, and in increased levels of surface crystallisation. To avoid surface crystallisation the invention therefore discloses the use of a reshaping process like that described in DE 10 2010 036 401 A1 for processing the surface of the heat sink, in particular the surface of the casting track onto which the molten mass is poured.

To summarise, an amorphous metal strip with a low level of surface crystallisation even over long continuous lengths is provided that provides good, uniform mechanical properties, in particular ductility and elongation at fracture. In the case of magnetic alloys, the amorphous metal strip also has good, uniform magnetic properties, where appropriate depending on the composition following nanocrystallisation.

If the amorphous metal strip is heat treated in order to produce the nanocrystalline metal strip, this nanocrystalline metal strip has good, uniform mechanical properties. In the case of a magnetic alloy, it also has good, uniform magnetic properties.

Examples of metal strips according to the invention are detailed in Table 1. Table 1 indicates the width B (mm), thickness D (μm), composition and thermal conductivity of the casting-wheel material (W/mK), the level of surface crystallisation determined (%) and the $\mu_{Dyn}$ of various examples of metal strips measured. The proportion of surface crystallisation is determined by means of powder diffractometry.

The strips are produced using rapid solidification technology, the surface of the casting track on the casting wheel being reshaped and smoothed by a roller during the casting process.

Table 1 also shows the relationship between the presence of marked surface crystallisation and the deterioration of soft magnetic properties by means of dynamic AC permeability μDyn (<100000).

TABLE 1

| | B [mm] | D [μm] | Fe [Wt.] | Nb [Wt.] | Ti [Wt.] | Al [Wt.] | Thermal conductivity of casting wheel material [W/mK] | Proportion of surface crystallisation [%] | $\mu_{Dyn}$ |
|---|---|---|---|---|---|---|---|---|---|
| 1* | 46 | 17.98 | 82.95 | 5.47 | 0.007 | 0.006 | 150 | 76 | 78353 |
| 2* | 58 | 19.25 | 85.53 | 2.87 | 0.007 | 0.004 | 290 | 93 | — |
| 3* | 58 | 20.12 | 86.02 | 4.69 | 0.004 | 0.002 | 230 | 65 | — |
| 4* | 58 | 20.29 | 82.98 | 5.42 | 0.006 | 0.007 | 290 | 53 | 81982 |
| 5 | 25 | 18.63 | 82.97 | 5.47 | 0.004 | 0.002 | 290 | 1 | 193549 |
| 6 | 46 | 18.10 | 82.97 | 5.46 | 0.002 | 0.004 | 290 | 6 | 115467 |
| 7 | 58 | 18.22 | 83.06 | 5.42 | 0.005 | 0.003 | 290 | 12 | 152960 |
| 8 | 46 | 18.69 | 83.39 | 4.21 | 0.007 | 0.003 | 290 | 4 | — |
| 9 | 58 | 22.90 | 85.94 | 4.35 | 0.005 | 0.002 | 330 | 0 | — |
| 10 | 58 | 17.40 | 86.01 | 4.34 | 0.005 | 0.002 | 330 | 1 | — |
| 11 | 108 | — | 82.98 | 5.43 | 0.005 | 0.002 | 290 | 0 | 138708 |

*Comparative examples
Wt. denotes weight percent

Wt. denotes weight percent

Examples 1 to 4 in Table 1 are comparative examples and show that surface crystallinity increases in wide (>50 mm), thick (>19 μm) strips with an increased iron content (>85 wt. %) and reduced niobium content (<5 wt. %) supported by titanium or aluminium impurities and when the thermal conductivity of the casting-wheel material is poor (<200 W/mK).

Examples 5 and 6 according to the invention show the opposite behaviour to examples 1 to 4. They involve a thin, narrow strip with a low iron content, a high niobium content and a very small amount of titanium and aluminium impurities. They show low levels of less than 10% surface crystallisation even at average casting-wheel material thermal conductivity.

Examples 7 and 8 according to the invention show that it is also possible to produce wide strips and strips with a reduced niobium content using an appropriate production process and appropriate processing of the casting wheel surface during production.

Examples 9 to 11 according to the invention illustrate that it is also possible to produce wide, thick strips with an increased iron content and reduced niobium content at the highest casting-wheel material heat conductivities and with a sufficiently low level of impurities.

As has already been mentioned above, surface crystallisation is characterised by the formation of crystalline grains that are different in the amorphous and the nanocrystalline microstructure of the core of the metal strip. These crystalline grains can be detected using transmission electron microscopy, for example.

FIG. 2A shows a dark-field transmission electron microscope image of a sample of an amorphous metal strip with surface crystallisation. The region of the image below the blue line, labelled "Pt", is merely a platinum layer applied for the purposes of sample preparation. The upper part of the image shows the amorphous microstructure of the sample by means of a uniform grey coloration. Below it, at the surface of the sample, two individual crystalline grains embedded in the amorphous microstructure with a grain size of approx. 140 nm can be seen. The arrows represent the crystalline orientation of the grain as determined by means of electron diffraction measurements.

Readily visible directly below the surface are two crystalline grains with a grain size of approx. 140 nm.

FIG. 2b shows a dark-field TEM image, which is the same sample except in the heat-treated nanocrystalline state. The amorphous sample is subjected to an appropriate heat treatment in order that the nanocrystalline microstructure is formed, that is clearly visible in FIG. 2b. Here the grains at the surface have grown into a continuous layer approx. 150 nm (one grain) deep with grain sizes of up to 300 nm. The upper portion of the image shows the nanocrystalline microstructure, each dot representing a grain with a grain size of approx. 15 nm. It should be noted that the two images have different length scales. A continuous crystalline layer can now been seen on the sample surface. It is exactly one grain length deep and so projects approx. 150 nm into the sample. The grain size of this layer is approx. 300 nm.

Though it is possible to detect surface crystallisation by means of transmission electron microscopy, this requires a long and complex sample preparation process. Here it is, therefore, powder diffractometry that is used as the detection method for measuring and evaluating surface crystallisation in metal strips.

A polycrystalline material in the individual grains exhibits statistically distributed crystal orientations similar to a powder, and can therefore be treated as such.

The measurements are carried out using Kα radiation from a copper anode in a Bragg-Brentano arrangement and an angular range of 2Θ=20° to 2Θ=125°. The measuring spot is approx. 10 mm in diameter and measurements are taken directly on the untreated surface of the strip. Copper Kα radiation with a wavelength of 1.54 Å has substantially less energy than molybdenum Kα radiation with a wavelength of 0.71 Å, for example. This ensures that the penetration depth is not too great for the measurement of surface crystallisation.

Evaluation of the penetration depth of the copper Kα radiation for Fe3Si gives d(1/e)=6.29 μm, i.e. radiation falls to a faction of 1/e after approx. 61 μm. For molybdenum, in contrast, the penetration depth is d(1/e)=46.22 μm. With a foil thickness of approx. 20 μm, it is therefore possible to observe the entire sample volume in the exposed region of approximately one square centimetre with this radiation.

However, since the crystalline surface layer represents no more than approx. 1.5% of the total volume (2×0.15 μm), it cannot be resolved in a measurement of the whole sample volume. This is different for copper Kα, where only the volume close to the surface contributes to the material response. The fact that surface crystallisation can only be detected using powder diffractometry when appropriate radiation is used may explain the lack of testing of this important material property.

The diffractogram of a complete amorphous sample shows no sharp reflexes, merely blurred reflexes that correspond to the associated crystalline microstructure in what are roughly the strongest reflex layers. FIG. 3 shows a diffractogram of this type for a sample of VITROPERM 800 (nominal composition in at. %: $Fe_{73.9}Cu_1Nb_3Si_{15.5}B_{6.6}$) The diffractogram in FIG. 3 shows the blurred, amorphous halo at a scattering angle of 2Θ=44.7°. The second, clearly smaller halo is also visible at roughly 2Θ=82°. The so-called amorphous halo for a typical nanocrystalline iron-based alloy has a scattering angle of 2Θ=44.7°.

Completely crystalline, cubic, body-centred α iron shows the strongest reflex, belonging to the (110) planes, at 2Θ=44.674° (100%), followed by the reflex of the (211) planes at 2Θ=82.335° (30.0%) and the (200) planes at 2Θ=65.023° (20.0%). Fe3Si, also cubic and body-centred, shows the strongest reflex of the (220) planes at 2Θ=45.237° (100%), followed by the reflex of the (422) planes at 2Θ=83.536° (21.3%) and the (400) planes at 2Θ=65.902° (12.8%).

Figure 4:
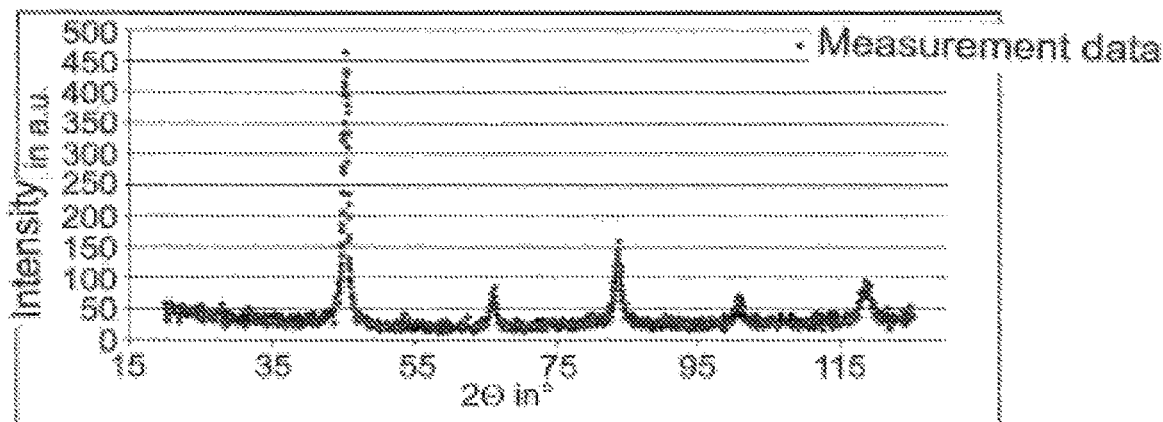
FIG. 4 shows a diffractogram of a nanocrystalline sample.

FIG. 4 shows a typical diffractogram for a completely nanocrystalline sample in which approx. 80% of the volume is nanocristallites with static orientation. The amorphous portion is visible only as a slight widening in the trailing flanks of the reflex. This amorphous portion can be separated using the methods described in EP 1260812, for example.

The diffractogram in FIG. 4 shows the sharp reflexes typical of a polycrystalline, cubic, body-centred crystal structure with statistical grain distribution. The amorphous portion is visible only as a slight widening in the trailing flanks of the reflexes. The strongest reflex layers for Fe3Si occur at:

(220)plane:2Θ=45.237°(100%), (422)plane:2Θ=83.536°(21.3%) and (400)plane:2Θ=65.902°(12.8%).

Figure 5A:
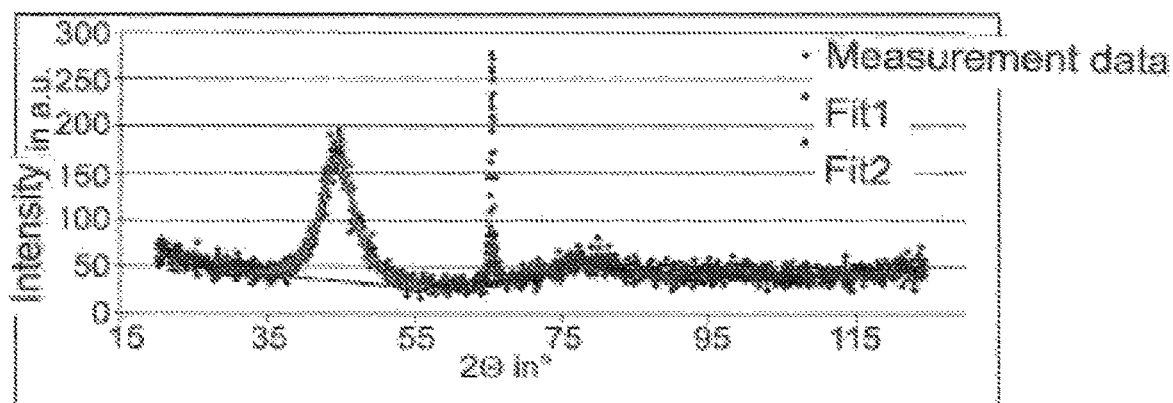
FIG. 5A shows a diffractogram of an amorphous sample with low surface crystallisation.
Figure 5B:
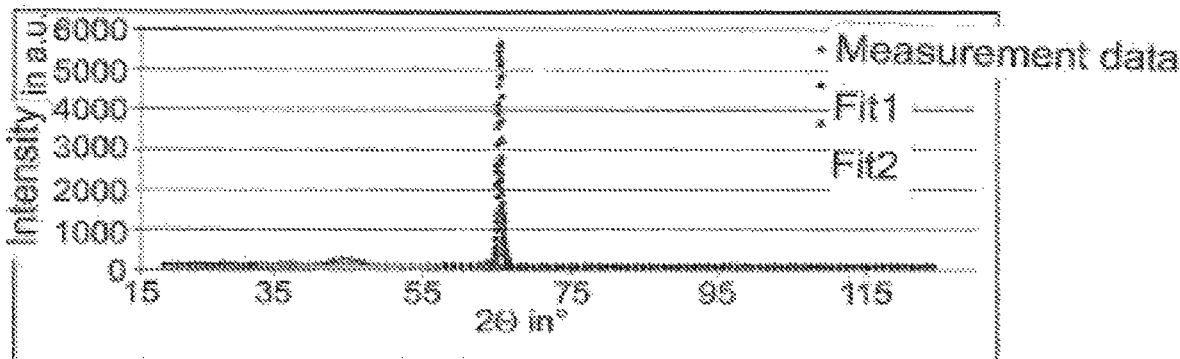
FIG. 5b shows a diffractogram, specifically an amorphous sample with very marked surface crystallisation.

FIG. 5a shows a diffractogram of an amorphous sample with little surface crystallisation and FIG. 5b shows a diffractogram of an amorphous sample with very marked (b) surface crystallisation.

In addition to the amorphous halo already seen in FIG. 3, FIG. 5A also shows a strong crystalline reflex at 2Θ=65.9°.

This corresponds to cubic, body-centred crystallites completely oriented in the (100) direction. This is referred to as the texture or crystallographic texture of a material.

FIG. 5b shows an amorphous sample with surface crystallisation. This diffractogram shows only the (400) reflex in addition to the amorphous microstructure. The surface crystallites are therefore very strongly textured in the (100) direction. This is confirmed by electron diffraction measurements. For this reason it is easy to separate the crystalline portion and the amorphous portion.

All the alloys in these examples contain silicon. The same considerations can, however, also be applied to silicon-free alloys.

The ratio between the surface portion of the crystalline reflex and the total surface portion of the amorphous halo and the crystalline reflex is regarded as a measure of surface crystallinity, with only the host halo of the amorphous microstructure being taken into account. Though the result corresponds in theory to the content by volume, it is strongly affected by the exposed volume and is consequently only comparable with an identical measurement setup.

Figure 6:
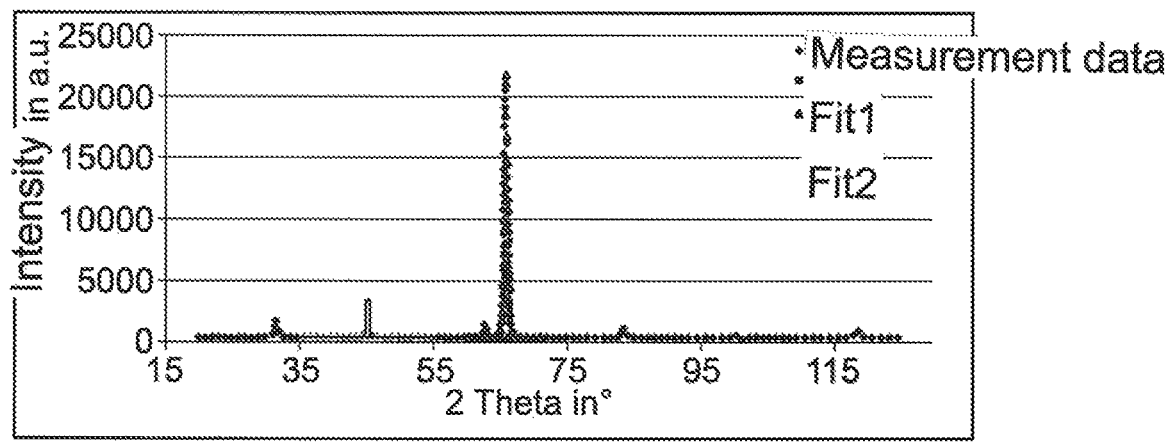
FIG. 6 shows a diffractogram, specifically a nanocrystalline sample with marked surface crystallisation.

The estimation of surface crystallisation in the nanocrystalline strip is somewhat less precise. FIG. 6 shows a diffractogram of a nanocrystalline sample with marked surface crystallisation. This diffractogram corresponds to the one shown in FIG. 4, but with a considerably higher (400) reflex. This is due to the textured crystalline portion in the volume considered, which is caused by surface crystallisation. The reflexes to the left of the (220) reflex and the (400) reflex are artefacts of the measurement (due to the inadequate filtering of Kβ radiation).

The significantly increased (400) reflex is clearly visible and can also be used to define a measure of surface crystallinity by determining the ratio between the area under the (400) reflex less 20% and the area under the (220) reflex and the total (400) reflex. This measure is comparable with the measure defined for the amorphous state, though less precise. This is firstly because only the strongest reflexes are used to calculate the total surface, while the portion of other reflexes in the diffractogram is ignored. Secondly, strictly speaking the deduction of 20% is only applicable to silicon-free samples. In samples containing silicon, the portion of surface crystallinity is underestimated to the extent of the silicon content of the crystalline grains formed.

Figure 7:
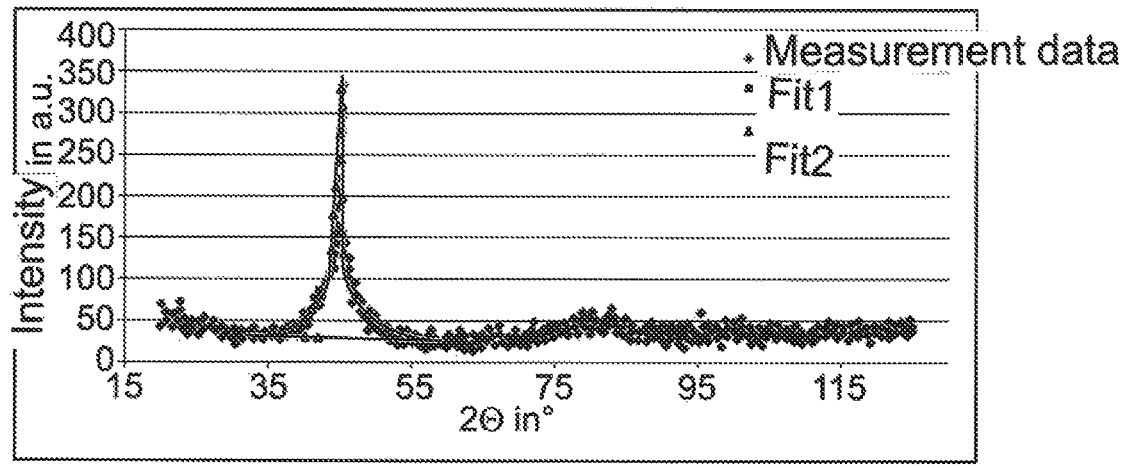
FIG. 7 shows a diffractogram of an amorphous sample with surface crystallisation that is not textured.

FIG. 7 shows the diffractogram of an amorphous sample with surface crystallisation. The amorphous sample has the composition $Fe_{81.1}Co_4Cu_{0.8}Si_{0.5}B_{9.54}P_{3.94}C_{0.12}$ (figures in at. %) with a sulphur impurity of 0.005 at. %. This diffractogram is realised in the same manner as the one shown in FIG. 4A, but the surface crystallisation has no texture. For this reason the strongest crystalline reflex in the surface crystallisation is the (220) reflex, coinciding with the amorphous halo as would be expected with a statistical orientation distribution. The (422) and (400) reflexes are suggested. Here, too, the extent of surface crystallisation is determined by calculating the area under the (220) peak and the amorphous halo. To adjust the curves, the fold in the two overlapping peaks is taken into account. It should be noted that it would be impossible to determine the level of surface crystallisation in the nanocrystalline state here since it would be no different in crystallographic terms from the surface crystallisation, which is untextured in this case.

This powder diffractometry method is used to examine a plurality of samples in order to examine the influence of various production parameters on surface crystallisation.

Figure 8A:
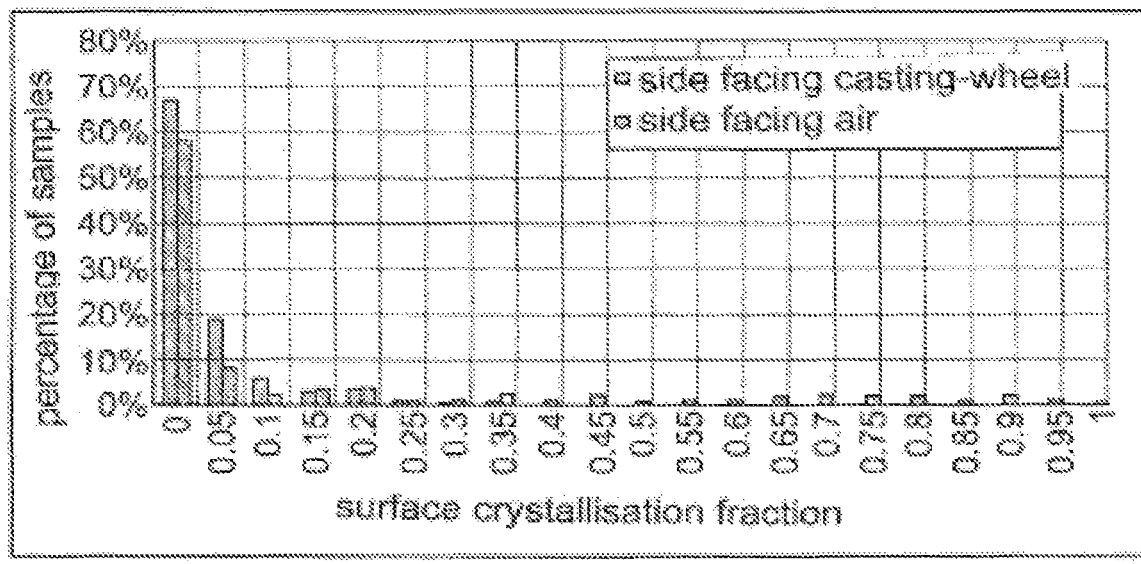
FIG. 8A shows a diagram comparing the extent of surface crystallisation on the free side of a metal strip and the side of a metal strip facing the casting wheel.
Figure 8B:
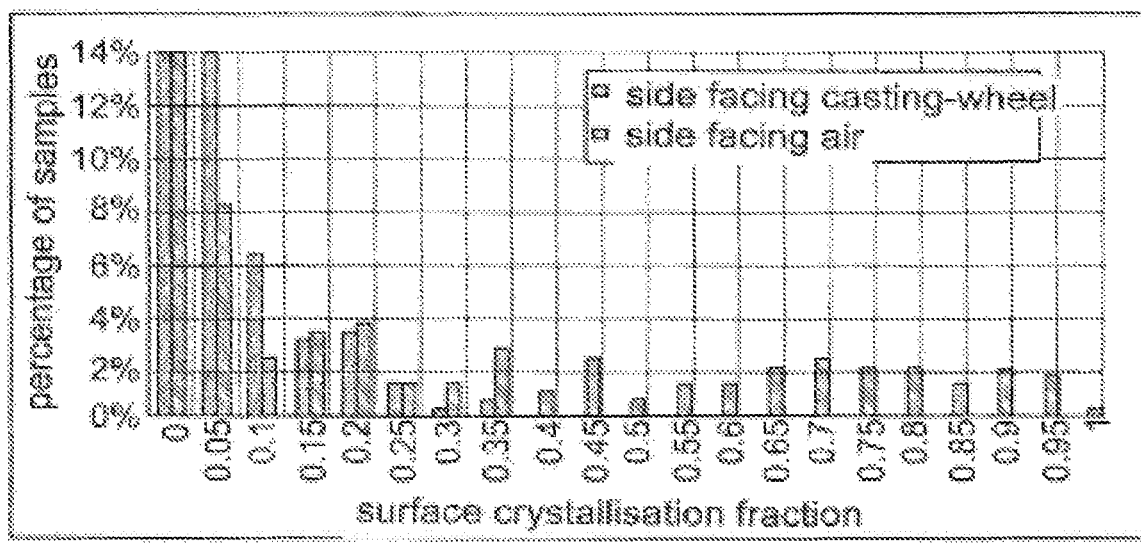
FIG. 8B shows the diagram comparing the extent of surface crystallisation of FIG. 8A at higher resolution for the region under 0.15.

FIGS. 8a and 8b show graphs of the extent of surface crystallisation comparing the free side and the side facing the casting wheel. The diagram of FIG. 8A shows the entire graph, the diagram of 8b shows a section of it providing better resolution for the region under 0.15. FIGS. 8a and 8b show the standardised number of over 400 samples examined that have a corresponding proportion of surface crystallisation. The compositions of these 400 samples range from amorphous soft magnetic alloys via nanocrystalline compositions to brazing alloys. All compositions are within the range indicated above.

It shows that no surface crystallisation proportions above 35% are measured for the side facing the casting wheel, while levels of up to 100% are found for the air-facing side. At 76.2%, the number of samples without surface crystallisation on the side facing the casting wheel is somewhat larger than that on the air side, which stands at 69.5%. In addition, no proportion of surface crystallisation of higher than 35% (fraction of 0.35) are measured on the casting-wheel side, while surface crystallisation proportions of up to 100% (fraction of 1) are observed on the air side. Overall, surface crystallisation occurred on approximately half of the samples examined (46.8%).

In the amorphous state, rapidly solidified, metallic strips exhibit very good mechanical properties. In a two-point bend test, for example, they exhibit elongations at fracture of up to 100% and hardnesses of approx. 10 GPa measured using a nanoindenter with a three-sided diamond Synton Berkovich tip. It has been found that the elongation at fracture drops by up to two orders of magnitude when crystallisation occurs in the material. This embrittlement can also be observed in the presence of surface crystallisation in otherwise amorphous material, though to a less marked extent. Surface crystallisation should therefore be avoided in order to achieve the problem-free mechanical further processing of the strips.

Amorphous and nanocrystalline materials have a small coercive field, as is required for good soft magnetic materials, as long as the grain sizes of possible crystalline regions are below the exchange interaction length and the orientation of the crystallites is statistically distributed. In such cases, crystal anisotropy averages out and has no disrupting, macroscopic influence.

Figure 9:
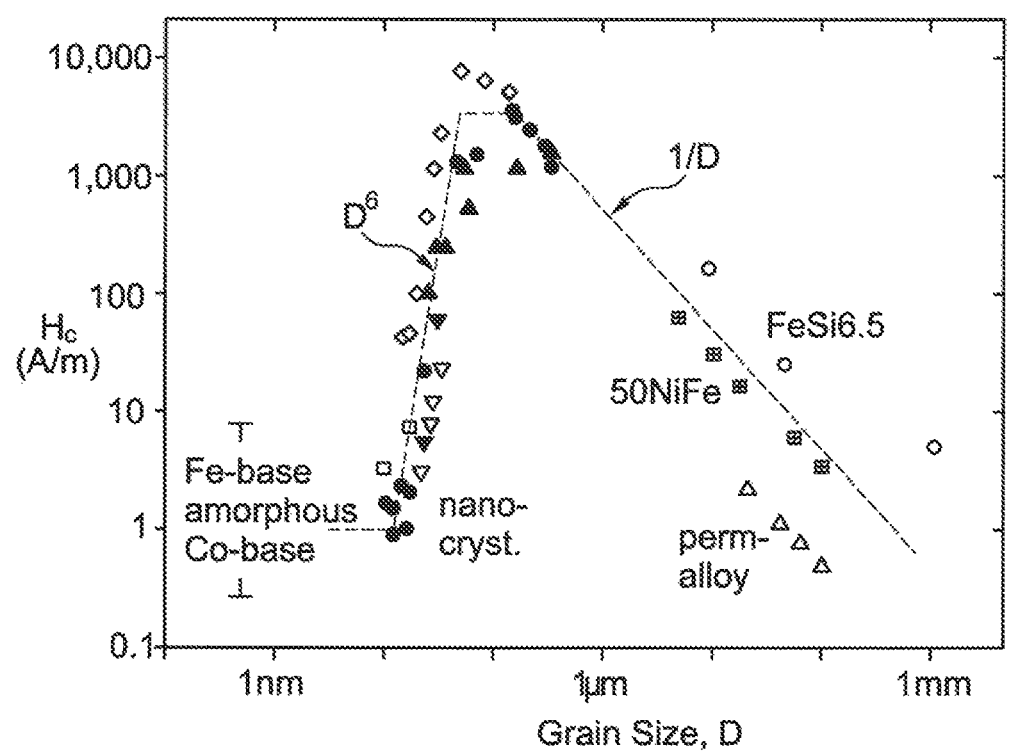
FIG. 9 shows a graph of coercive field strength as a function of grain size.

FIG. 9 shows a diagram of the relationship between coercive field strength and grain size taken from the "Handbook of Magnetic Materials", G. Herzer, Vol. 10, Chapter 3. It shows that the highest coercive field strengths are measured for grain sizes of between 100 nm and 300 nm. This corresponds to the grain size of a typical surface crystallisation, which in this case is also generally strongly textured.

This makes it possible to reliably provide good magnetic properties when surface crystallisation is limited and surface crystallisation is preferably avoided as far as is possible.

Figure 10A:
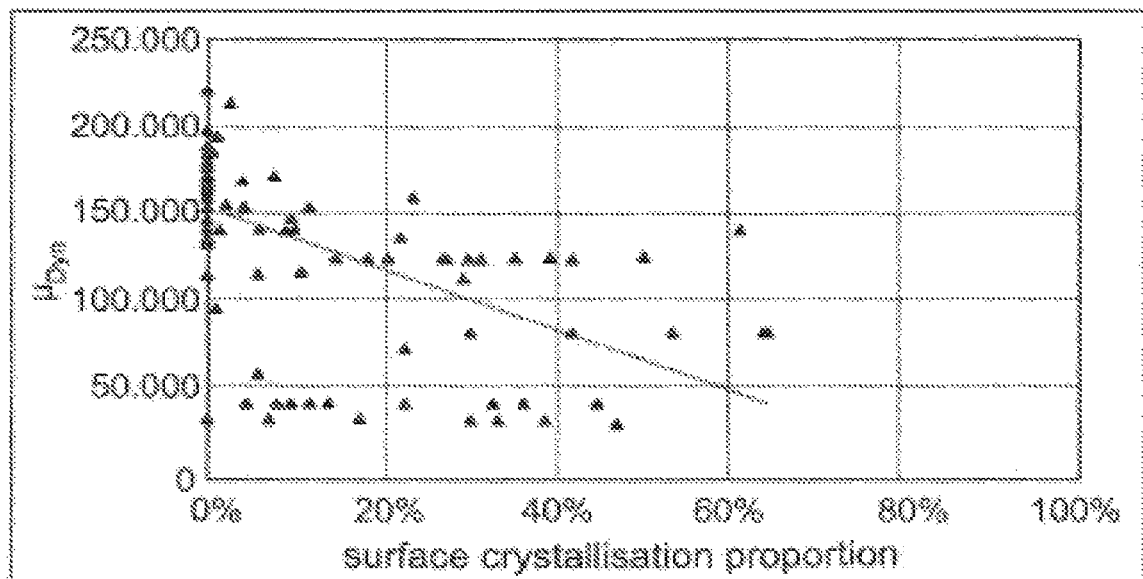
FIG. 10A shows a graph of AC permeability with two-way sine modulation at 1.5 A/m and 50 Hz μDyn as a function of surface crystallisation.
Figure 10B:
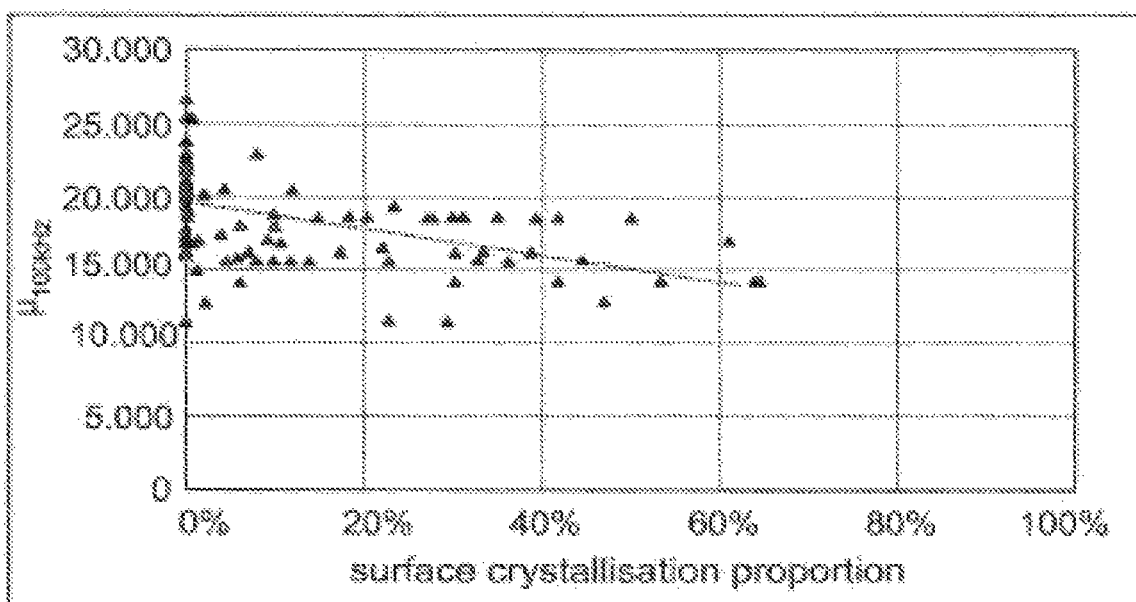
FIG. 10B shows a graph of AC permeability with modulation at 0.3 A/m and 100 kHz μ100 kHz as a function of surface crystallisation.

FIGS. 10a and 10b show AC permeability measured with two-way sine modulation at 1.5 A/m and 50 Hz, so-called dynamic permeability ρDyn measured at a sine modulation of 0.3 A/m and 100 kHz as a function of surface crystallisation, the maximum air and casting-wheel side values being applied. Although both the measurement of surface crystallinity and the determination of dynamic permeability are subject to significant measurement inaccuracies, the negative influence of surface crystallinity on the magnetic characteristics of the material is clearly visible.

The image of FIG. 10A shows that it is still entirely possible to achieve a dynamic permeability of greater than 150000 with a surface crystallisation proportion of 23%.

FIG. 9 reveals that a surface crystallisation proportion of up to 23% is tolerable without a significant reduction in soft magnetic performance. Brittleness tests confirm this result, the figure of 23% relating to the measuring method described above using X-ray powder diffractometry with copper Kα radiation.

Figure 11:
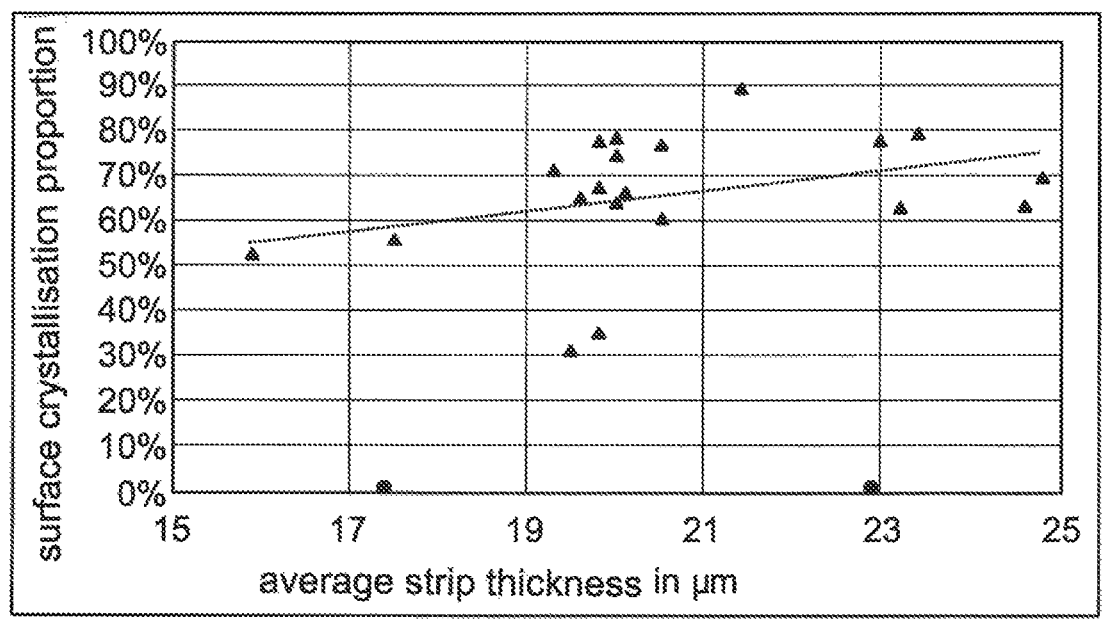
FIG. 11 shows a graph of the surface crystallisation as a function of average strip thickness.

FIG. 11 shows a graph of surface crystallisation as a function of average strip thickness. It shows that surface crystallisation increases with rising strip thickness. Owing to its low metalloid content in general and its low niobium content in particular, the present alloy tends towards higher levels of surface crystallisation. It was chosen in order to make the connection between thickness and surface crystallisation visible even at standard thicknesses of approx. 20 μm. The two green dots correspond to embodiments 9 and 10 and show that it is also possible, at high casting-wheel material thermal conductivity and optimum production, to produce this alloy free of surface crystallisation in the standard thickness.

To summarise, an amorphous or nanocrystalline metal strip is provided that has surface crystallisation proportion of less than 23%, preferably less than 5%, preferably 0%, the proportion of surface crystallisation being determined using the powder diffractometry process described above. An amorphous strip of this type is produced using a rapid solidification technology. A nanocrystalline strip can be formed from the amorphous strip by heat treating the amorphous strip.

When producing the amorphous metal strip, the cooling rate of the solidification of the molten mass or melt is adjusted and maintained over the duration of the casting process such that the formation of crystallisation at the surface of the metal strip, and in particular in a surface layer on the air side of the metal strip, is prevented as far as possible over the length and width of the metal strip. In this way, longer amorphous metal strips can be reliably provided on an industrial-scale and with reliable mechanical and, depending on composition, magnetic properties.

The invention claimed is:

1. A metal strip, comprising:
   a casting-wheel side that has solidified on an outer surface of a heat sink made of a material having a thermal conductivity greater than 200 W/mK and a Vickers hardness of less than 250 HV but greater than 130 HV;
   an air side opposing the casting-wheel side,
   a microstructure that is at least 80 vol. % amorphous,
   the air side having a surface crystallisation proportion of less than 23%,
   wherein the surface crystallisation proportion is determined from a 0-20 X-ray powder diffractogram of the air side of the metal strip obtained using copper Kα radiation, the X-ray powder diffractogram comprising a characteristic reflex of a crystalline phase and a halo characteristic of an amorphous phase, wherein the surface crystallisation proportion is determined by dividing the area under the characteristic reflex of the crystalline phase by the sum of the area under the halo of the amorphous phase and the area under the characteristic reflex of the crystalline phase,
   wherein at least 80 vol. % of the crystalline grains of the surface crystallisation of the air side have an average grain size of greater than 100 nm, and
   wherein the metal strip comprises a titanium content of less than 0.25 at. %, an aluminium content of less than 0.4 at. %, a manganese content of less than 0.4 at. % and a sulphur content of less than 0.35 at. %.

2. The metal strip according to claim 1, wherein the air side comprises a surface crystallisation proportion of less than 5%.

3. The metal strip according to claim 1, wherein the casting-wheel side comprises a surface crystallisation proportion of less than 23%.

4. The metal strip according to claim 1, wherein the metal strip comprises a surface layer that forms between 0.01% and 5% of the total volume and contains crystalline grains that form the surface crystallisation.

5. The metal strip according to claim 4, wherein the crystalline grains of the surface crystallisation have a crystallographic texture.

6. The metal strip according to claim 1, wherein the metal strip comprises
   a width of 2 mm to 300 mm, and/or
   a thickness of less than 50 μm.

7. The metal strip according to claim 1, wherein the metal strip consists of $(Fe,T)_a M_b$ and up to 1 at. % impurities, where 70 at. %≤a≤90 at. % and 10 at. %≤b≤30 at. %, T being one or more of the elements Co, Ni, Cu, Cr, Zn, Sn and V, and M being one or more of the elements Nb, Mo, Zr Ta, B, Si, C and P.

8. The metal strip according to claim 1, wherein the metal strip consists of $Fe_{100-a-b-w-x-y-z} T_a M_b Si_w B_x P_y C_z$ (in at. %) and up to 1 at. % impurities, T being one or more of the group consisting of Co, Ni, Cu, Cr, Zn, Sn and V, and M being one or more of the group consisting of Nb, Mo, Zr and Ta, where $0 \le a \le 80$ $0 \le b \le 10$ $0 \le w \le 25$ $2 \le x \le 20$ $0 \le y \le 7$ $0 \le z \le 2$.

9. The metal strip according to claim 7, wherein the metal strip has a dynamic permeability $(\mu_{dyn}) > 100000$.

10. The metal strip according to claim 7, wherein the casting-wheel side of the metal strip having a surface roughness with an arithmetic mean, Ra, of less than 0.8 μm.

11. A soft magnetic core or an inductive component including the metal strip according to claim 1.

12. An antenna or sensor including the soft magnetic core of claim 1.

13. A blade, an amorphous spring or a knife blade including the metal strip according to claim 1.

14. A brazing foil including the metal strip according to claim 1.

15. A layer of a laminate including the metal strip according to claim 1.

16. A shielding foil in an object with parts for wireless charging including the metal strip according to claim 1.

17. A shielding foil in an object with parts to be shielded including the metal strip according to claim 1.

18. A shielding foil according to claim 17, the parts to be shielded being one or more of the group consisting of electronic components, cables, sensor ranges and cavities.

19. The metal strip according to claim 10, wherein the casting-wheel side of the metal strip has a surface roughness with an arithmetic mean, Ra, of less than 0.7 μm.

20. The metal strip according to claim 1, wherein the surface crystallisation proportion of less than 23% extends over a length of at least 2 km.

21. The metal strip according to claim 1, wherein the metal strip comprises $Fe_{73.5}Cu_1Nb_3Si_{15.5}B_{6.6}$; the characteristic reflex of the metal strip is located in the θ-2θ X-ray powder diffractogram at a scattering angle 2θ=65.902°; and the halo is located in the θ-2θ X-ray powder diffractogram at a scattering angle 2θ=44.7°.

22. A metal strip, comprising:
a casting-wheel side that has solidified on an outer surface of a heat sink made of a material having a thermal conductivity greater than 200 W/mK and a Vickers hardness of less than 250 HV but greater than 130 HV;
an air side opposing the casting-wheel side; and
a microstructure that has at least 80 vol. % nanocrystalline grains
in which at least 80% of the nanocrystalline grains have an average grain size of less than 50 nm and a random orientation and a residual amorphous matrix;
the air side having a surface crystallisation proportion of less than 23%;
the metal strip comprising a surface layer that forms between 0.01% and 5% of the total volume and contains crystalline grains that form the surface crystallisation of the air side;
at least 80 vol. % of the crystalline grains of the surface crystallisation having an average grain size of greater than 100 nm;
the crystalline grains of the surface crystallisation having a crystallographic texture; and
wherein the surface crystallisation proportion is determined from a θ-2θ X-ray powder diffractogram of the air side of the metal strip obtained using copper Kα radiation, the X-ray powder diffractogram comprising a first characteristic reflex of a crystalline phase of the surface crystallisation and a second characteristic reflex of the nanocrystalline grains,
wherein the surface crystallisation proportion is determined by dividing an area under the first characteristic reflex of the crystalline phase minus a portion of the first characteristic reflex contributed by the nanocrystalline grains by the sum of the area under the second characteristic reflex of the nanocrystalline phase and a total area under the first characteristic reflex of the crystalline phase.

23. A method for production of an amorphous metal strip using a rapid solidification technology, the method comprising:
providing a molten mass of an alloy;
continuously pressing a rolling device against an outer surface of a rotating heat sink as the molten mass is poured onto the outer surface of the rotating heat sink with a pressure sufficient to smooth the outer surface of the heat sink, the heat sink being made of a material having a thermal conductivity greater than 200 W/mK and a Vickers hardness of less than 250 HV but greater than 130 HV,
the molten mass solidifying on the outer surface and an amorphous metal strip being formed,
the amorphous metal strip having a casting-wheel side that has solidified on the outer surface of the heat sink,
an air side opposing the casting-wheel side,
and a microstructure that is at least 80 vol. % amorphous,
the air side having a surface crystallisation proportion of less than 23%,
wherein the surface crystallisation proportion is determined from a θ-2θ X-ray powder diffractogram of the air side of the amorphous metal strip obtained using copper Kα radiation, the X-ray powder diffractogram comprising a characteristic reflex of a crystalline phase and a halo characteristic of an amorphous phase,
wherein the surface crystallisation proportion is determined by dividing the area under the characteristic reflex of the crystalline phase by the sum of the area under the halo of the amorphous phase and the area under the characteristic reflex of the crystalline phase,
wherein at least 80 vol. % of the crystalline grains of the surface crystallisation of the air side have an average grain size of grater than 100 nm, and
wherein the metal strip comprises a titanium content of less than 0.25 at. %, an aluminium content of less than 0.4 at. %, a manganese content of less than 0.4 at. % and a sulphur content of less than 0.35 at. %.

24. The method according to claim 23, wherein the casting-wheel side has a surface crystallisation proportion of less than 23%.

25. The method according to claim 23, wherein the amorphous metal strip has a width of 2 mm to 300 mm and/or a thickness of less than 50 μm.

26. The method according to claim 23, wherein the metal strip has a surface layer that comprises between 0.01% and 5% of the total volume and contains crystalline grains that form the surface crystallisation.

27. The method according to claim 23, wherein the rolling device is pressed against the outer surface of the heat sink such that it continuously reduces the roughness of the outer surface of the heat sink as the molten mass is poured onto the outer surface of the heat sink.

28. The method according to claim 23, wherein a rotatable roller is provided as the rolling device and the surface of the rotating roller is pressed against the outer surface of the rotating heat sink with a pressure that the outer surface of the heat sink is reshaped.

29. The method according to claim 23, wherein a rotatable roller is provided as the rolling device and the roller is driven in a first direction of rotation and the heat sink is driven in a second direction of rotation, the first direction of rotation being opposite the second direction of rotation.

30. The method according to claim 23, wherein the roller is moved over the outer surface of the heat sink parallel to a second axis of rotation of the heat sink such that contact with the outer surface of the heat sink is spiral-shaped.

31. The method according to claim 23, wherein the outer surface of the heat sink is protected by organic material at least at the point at which the molten mass hits the outer surface as the molten mass is poured onto the moving outer surface of the moving heat sink.

32. The method according to claim 23, wherein the metal strip consists of $(Fe,T)_a M_b$ and up to 1 at. % impurities, where 70 at. %≤a≤90 at. % and 10 at. %≤b≤30 at. %, T being one or more of the elements Co, Ni, Cu, Cr, Zn, Sn and V and M being one or more of the elements Nb, Mo, Zr, Ta B, Si, C and P.

33. The method according to claim 23, wherein the metal strip consists of $Fe_{100-a-b-w-x-y-z} T_a M_b Si_w B_x P_y C_z$ (in at. %) and up to 1 at. % impurities, being one or more of the group consisting of Co, Ni, Cu, Cr, Zn, Sn and V, and M being one or more of the group consisting of Nb, Mo, Zr and Ta, where $0 \leq a \leq 80$ $0 \leq b \leq 10$ $0 \leq w \leq 25$ $2 \leq x \leq 20$ $0 \leq y \leq 7$ $0 \leq z \leq 2$.

34. A method for producing nanocrystalline foil, comprising:
heat treating the amorphous metal strip produced using the method according to claim 23 at a temperature Ta, where 400° C. ≤Ta≤750° C., in order to generate a nanocrystalline structure in the metal strip in which at least 80 vol. % of the grains have an average size of less than 50 nm and a random orientation.

35. The method according to claim 34, wherein the strip is heat treated in a continuous furnace.

36. The method according to claim 35, wherein the strip is drawn through the continuous furnace at a speed s such that a strip dwell time in a temperature zone of the continuous furnace with a temperature Ta is between two seconds and two minutes.

37. The method according to claim 34, wherein the strip is continuously heat treated under a tensile stress of 5 MPa to 1000 MPa.

38. The method according to claim 35, wherein
magnetic properties of the metal strip are measured continuously as the metal strip leaves the continuous furnace, and
if deviations from permitted deviation ranges of the magnetic properties are detected, then tensile stress on the metal strip is adjusted in order to bring the measured values of the magnetic properties back within the permitted deviation ranges.

39. The metal strip according to claim 22, wherein the metal strip comprises $Fe_{73.9}Cu_1Nb_3Si_{15.5}B_{6.6}$; the first characteristic reflex is located in the θ-2θ X-ray powder diffractogram at a scattering angle 2θ=65.902°; and the second characteristic reflex is located in the θ-2θ X-ray powder diffractogram at a scattering angle 2θ=45.237°.

40. The metal strip according to claim 22, wherein the metal strip comprises a titanium content of less than 0.25 at. %, an aluminium content of less than 0.4 at. %, a manganese content of less than 0.4 at. % and a sulphur content of less than 0.35 at. %.

41. The metal strip according to claim 22, wherein the surface crystallisation proportion of less than 23% extends over a length of at least 2 km.

* * * * *